United States Patent
Tookey et al.

(10) Patent No.: US 7,953,506 B2
(45) Date of Patent: May 31, 2011

(54) SKIN DESIGN PROCESS

(75) Inventors: Richard Mark Tookey, Lytham (GB); Marcus Gavin Spicer, Preston (GB); Dean Frederick Dagger, Preston (GB); Robin David Stuart Main, Lytham (GB); William Sargeant, Freckleton (GB)

(73) Assignee: BAE Systems PLC, London (GB)

( * ) Notice: Subject to any disclaimer, the term of this patent is extended or adjusted under 35 U.S.C. 154(b) by 347 days.

(21) Appl. No.: 11/722,057

(22) PCT Filed: Dec. 14, 2005

(86) PCT No.: PCT/GB2005/050245
§ 371 (c)(1),
(2), (4) Date: Oct. 30, 2009

(87) PCT Pub. No.: WO2006/064287
PCT Pub. Date: Jun. 22, 2006

(65) Prior Publication Data
US 2010/0042242 A1 Feb. 18, 2010

(30) Foreign Application Priority Data

Dec. 17, 2004 (EP) .................................. 04257936
Dec. 17, 2004 (GB) ................................. 0427662.2

(51) Int. Cl.
*G06F 19/00* (2006.01)

(52) U.S. Cl. ............... 700/98; 700/95; 700/97; 700/182; 703/1; 264/512; 52/630

(58) Field of Classification Search ............... 700/95, 700/97, 98, 182; 703/1; 264/512; 52/630
See application file for complete search history.

(56) References Cited

U.S. PATENT DOCUMENTS

| 5,683,646 A | 11/1997 | Reiling, Jr. |
| 6,684,593 B2 * | 2/2004 | Brenneis et al. ................. 52/630 |
| 6,748,284 B1 | 6/2004 | Vaughan |

FOREIGN PATENT DOCUMENTS

EP 1 241 550 A2 9/2002

OTHER PUBLICATIONS

International Preliminary Examination Report issued in PCT/GB2005/050245, dated Jun. 19, 2007, 2 pages.
Written Opinion of the International Search Authority in PCT/GB2005/050245, dated Jun. 19, 2007, 7 pages.

* cited by examiner

*Primary Examiner* — Albert Decady
*Assistant Examiner* — Tejal J Gami
(74) *Attorney, Agent, or Firm* — Pillsbury Winthrop Shaw Pittman LLP

(57) ABSTRACT

A method of designing a virtual model for the manufacture of a blended body structure having two or more constituent elements, the method comprising the step of defining a parameterised, theoretical procedural skin from which two or more datum skins are generated, each datum skin defining a production outline of an airframe structure constituent element. The use of a procedural model with embedded parameterisation and associativity to derive the datum skins reduces the time taken to produce the datum skins and enables feature modifications to be incorporated into models quickly and consistently.

14 Claims, 1 Drawing Sheet

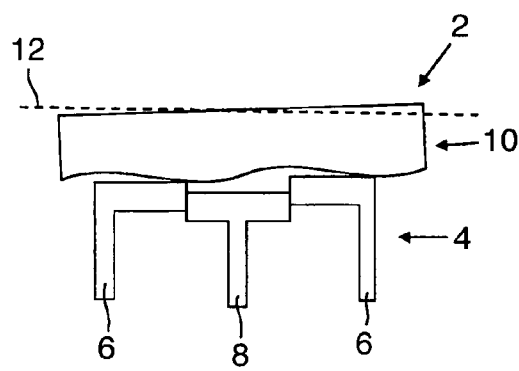
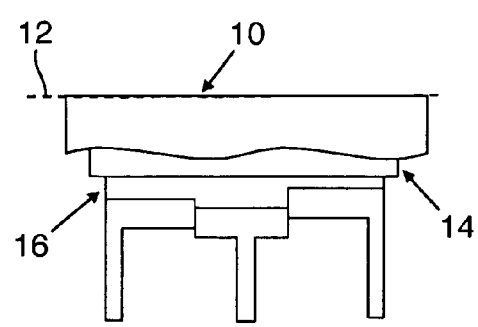
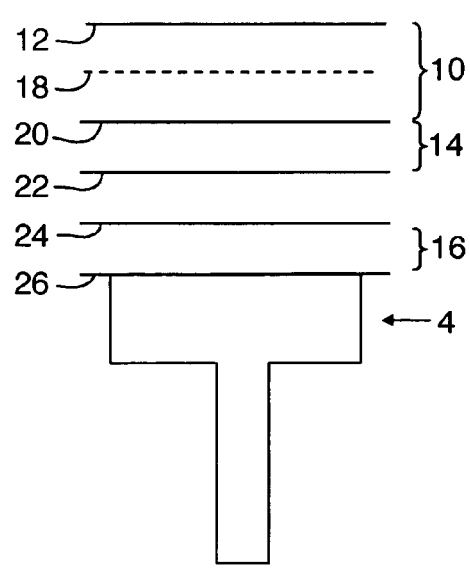
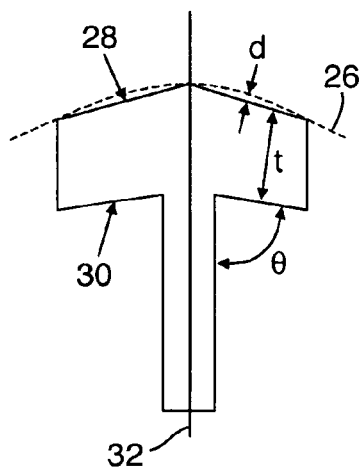

SKIN DESIGN PROCESS

CROSS REFERENCE TO RELATED APPLICATIONS

This is the U.S. National Phase of PCT/GB2005/050245, filed Dec. 14, 2005, which in turn claims priority to European application No. 04257936.7 filed Dec. 17, 2005, and British application No. 0427622.2, filed on Dec. 17, 2004, both of which are incorporated herein in their entirety by reference.

This invention relates to a method of designing a virtual model for the manufacture of a complex blended, layered body structure, and in particular, but not exclusively, to a method of designing and manufacturing an airframe structure.

An aircraft design is dictated by the internal load-bearing structure of the airframe, the enclosure of that structure to suit aerodynamic requirements, and the necessary provision, between the two, of an optimum stress flow path to reduce stress concentration and to achieve the transfer of load between the internal structure and the aerodynamic surface. The structure is therefore required to be thicker in areas of loading and thinner wherever possible to minimize weight, with ramps between thicker and thinner regions to better accommodate stress.

Modern aircraft are assembled with tight build tolerances to satisfy aerodynamic criteria. Significant care must therefore be taken in the modeling processes during the design of aircraft and in the machining processes during the manufacture of aircraft. The stack-up of tolerances within the assembly needs to be managed and variation in the thickness of composite skin panels taken into account.

The problem of manufacturing the outer profile of the aircraft according to the design is exacerbated when aircraft skin panels are manufactured as carbon fiber composite (CFC) parts, with the associated deformation problems due to curing and spring-back, and frames and spars of the substructure assembly are manufactured out of metal.

CFC parts are manufactured by laying carbon fiber onto a mould tool. Depending on the complexity of the mould tool, fibers can be lain in uni-directional bundles using a fibre-placement machine, in uni-directional tapes using a tape-laying machine, or in interlaced cloths by hand. The bundles, tapes and/or cloths are often pre-pregnated with thermo-setting resin. Plies are formed by laying fibers at certain angles (often multiples of 45°) within specified zone boundaries. Repeated layering results in a composite panel with ply zones of constant thickness and drop slopes of variable thickness. Each ply zone contains interlaced plies each having a constant thickness, typically 0.15 mm. The mould tool containing the layered plies is then placed into an autoclave for hot curing which melts the resin, and bonds adjacent plies.

The composite part, however, tends to deform due to residual stresses as it cools down when removed from the mould tool. The mould tool may therefore be biased to allow for this so that the panel springs back into the correct shape. CFC spring-back is a complex non-linear phenomenon which makes accurate prediction difficult without physical testing. An iterative process is used, comprising modeling the shaped skin, manufacturing a part and reviewing the part design. The spring-back can then be predicted through the measurement of a discrete array of surface points. Biased mould tools are designed and parts manufactured until the desired shape is achieved.

Additional elements that can be machined to allow for expected variations in panel thickness and substructure assembly positioning can be introduced between the substructure assembly and the composite skin panel. This enables the complete assembly Outer Mould Line (OML), i.e. the outer shape of the aircraft, to be maintained within the required tolerance. Typically, sacrificial plies are applied to the inner surface of the composite skin panel and a shim to the substructure assembly. The design process then requires the definition of a series of related Inner Mould Line (IML) surfaces defining the shapes of components and assemblies, for use in part and tooling models, and machining operations.

Currently, individual geometric definitions are created for each constituent part of the structure, with all IMLs defined separately as datum faces based on manual calculations. An OML model contains faces with support surfaces representing the external shape. A Key Diagram Model contains faces, with support planes, representing the internal structure. Information on the initial thicknesses for the skin panels, ply zone boundaries, percentage requirements for ply orientations, and flange widths for frames and spars is transferred onto the OML model and the Key Diagram Model, to provide a Structural Zone Model.

After several iterations between the design requirements and structural necessities the Structural Zone Model evolves into a Ply Definition Model. In the Ply Definition Model zone boundaries, i.e. boundaries of the drop slopes, are positioned on the IML, the ply orientations are balanced across all zones and the stacking sequence of the plies is determined. Each IML is constructed directly from the OML for design traceability and to avoid any potential tolerance stack-ups.

This iterative current design process is labor-intensive and time consuming. Errors in a part are propagated throughout the design and magnified with each propagation. In particular, the impact of a design change at the top level has to be laboriously propagated down manually into the lower level airframe structure. For example, if a change is made to the OML, the design of many skins, ribs and spars will be affected, and each part has to be changed to satisfy the new assembly condition.

Accordingly, the present invention provides a method of designing a virtual model of a blended body structure having two or more layered components, the method comprising the steps of defining a parameterised, theoretical procedural skin and generating two datum skins from the procedural skin, each datum skin defining a working surface.

The use of a procedural model with embedded parameterisation and associativity to derive the datum skins reduces the time taken to produce the datum skins and enables feature modifications to be incorporated into models more quickly and consistently than with conventional methods. The time required for checking for errors in the skins is reduced due to the derivation of datum skins from a procedural skin.

The working surface may be the surface of a blended body structure component. Such a working surface provides indication of the location of a manufactured surface. In a layered structure, this surface may be the abutment surface of two components. Alternatively, the working surface may be a hypothetical surface related to, and either internal or external to, a component. Such an internal surface, for example, may be used in stress analysis of the component.

In the event the surface of the procedural skin or of a datum skin is non-planar (e.g. curvilinear), the method may further comprise generating a "drop slope", that is a linearly-tapered offset surface from the non-planar surface. This offset surface may be generated within a specified tolerance.

Such an arrangement enables the rapid virtual representation of the multiple ply product, and allows for the physical changes which occur during manufacture, such as shrinkage, etc. This method of modeling drop slopes may be used independently of the other aspects of the present invention.

Preferably, the definition of the procedural skin comprises the steps of defining at least one primary ply zone surface and defining at least one primary drop slope surface wherein the surface of the drop slope intersects the surface of a ply zone along a joint line.

An airframe structure typically comprises a skin panel of varying thickness. Definition of the skin panel topology therefore requires definition of a ply zone surface in an area of constant thickness and a drop slope surface in an area of varying thickness.

The method may further comprise the step of defining a secondary ply zone surface as a normal offset to each primary ply zone surface, and a secondary drop slope surface as a normal offset to each primary drop slope surface.

Offsetting secondary ply zones and drop slope surfaces from respective primary surfaces enables allowances to be incorporated between structure components, for part-to-part gaps and adhesive allowances for example.

Where at least one ply zone surface or drop slope surface is oversized, the method may further comprise the step of trimming the or each oversized surface to the joint line. This ensures that the ply zone and drop slope surfaces are joined to form a continuous surface. Where at least one ply zone surface or drop slope surface is undersized, each undersized surface is extended to the joint line.

At least one ply zone surface or drop slope surface may be non-planar. A non-planar surface may be singly-curved (i.e. has zero curvature in one direction), doubly-curved (i.e. has continuous curvature in two orthogonal directions) or faceted (i.e. has discontinuous tangent in either one direction or two orthogonal directions). Facets can be planar or singly-curved. When at least one ply zone surface or drop slope surface is non-planar, the method preferably comprises the further step of generating a faceted surface in approximation of at least one curved surface in the procedural skin or a datum skin.

This optimizes the airframe structure design for ease of manufacture, removing the need to use expensive, time-consuming scan machining processes. The use of an edge cutter to machine a singly-curved faceted surface reduces the machining time and cost. A tolerance for the approximation may be specified, and the faceted surface approximation generated within the tolerance. This limits the chord-height error between the curved surface and the faceted approximation and therefore improves the accuracy of the approximating surface. The approximation of a doubly-curved surface with a singly-curved or planar faceted surface may be made to a curved surface in a datum skin.

Further datum skins may be generated by combining the above method steps. It is beneficial for each component layer to be described in an airframe structure model by a datum skin. More datum skins will therefore be required for airframe structures with more components.

It will be appreciated that the present invention may be embodied in software. Accordingly, the present invention extends to a computer program element comprising program code for configuring a microprocessor to implement the above described method. Suitably, the computer program is stored on a carrier medium.

The invention will now be described by way of example and with reference to the accompanying drawings, in which:

FIG. 1 is a schematic view of an airframe structure assembly;

FIG. 2 is a schematic view of a substructure and parts for assembly into an aircraft structure;

FIG. 3 shows the doubly-curved IML surfaces used to define the shapes of assemblies in an airframe structure, and FIG. 4 shows the faceted flange surfaces used to define the shapes of components in an airframe structure.

FIG. 1 shows a structure 2 forming part of an aircraft comprising a substructure assembly 4 having a frame 6 and spar 8, and a composite skin panel 10 to be fitted to the substructure assembly 4. The required OML profile 12 (i.e. the external aircraft surface shape) is chosen to meet aerodynamic criteria. Each part is therefore required to be manufactured and assembled to strict tolerances. Due to variations in the thickness of composite skin panels 10 and errors in part-positioning during substructure assembly, the structure 2 does not match the required OML profile 12.

FIG. 2 shows the substructure assembly 4 and composite skin panel 10 of FIG. 1. Sacrificial plies 14 are applied to the inner surface of the composite skin panel 10 and a shim 16 to the substructure assembly 4. These are additional elements that can be machined to allow for variations in panel thickness and substructure assembly positioning errors, and they enable the OML 12 to be maintained within the required tolerance. The design process is therefore required to include a definition of a series of related surfaces (IMLs) which define the surface shapes of components and assemblies.

Airframe structures with composite skins and metallic substructures commonly use five IMLs, as shown in FIG. 3: the Neutral Axis IML 18 to define the composite skin panel mid-ply for use, for example, in stress analysis calculations; the Nominal Skin IML 20 to design the inner surface of the composite skin panel; the Nominal Machined Skin IML 22 to indicate the machined surface of sacrificial plies to form the inner shape of a composite skin panel; the Nominal Machined Structure IML 24 to indicate the machined surface of a shim to form the outer shape of a structural assembly, and the Nominal Structure IML 26 to define the outer shape of a structural component. The skin panel 10 is manufactured as a CFC component with variable thicknesses from the OML 12. Constant percentage growth allowances are added to the variable component thicknesses to accommodate any shrinkage or growth that may occur during the curing process. Consequently, the Nominal Machined Skin IML 22 is a variable normal offset from the Nominal Skin IML 20. The Nominal Machined Structure IML 24 is, however, a constant normal offset from the Nominal Machined Skin IML 22; the offset provides an allowance for adhesive and part-to-part gaps. Each of these surfaces requires a model definition as part of the design process.

Components, e.g. frames and spars, within airframe structures commonly use 2 flange surfaces, as shown in FIG. 4: the outer flange surface 28 to define the outer singly-curved faceted surface for flank machining, and the inner flange surface 30 to define the inner planar faceted surface for end milling. The web plane 32, the chord-height error (d), the flange thickness (t) and the web angle ($\theta$) are also shown.

The structure design process in accordance with the invention exploits the fact that the topology is identical for each IML even though the actual faces of each IML are slightly different in position and size. A model of an OML skin is first constructed with appropriate faces representing the external shape of the aircraft, as defined by the design requirements, for example aerodynamic criteria.

Layers are created, offset from the OML by parameterised thicknesses normal to the OML skin. The offsets correspond to the ply zone thicknesses given in the Key Diagram Model, and may take into account adhesive and machining allowances and a skin growth factor. These offset layers form oversized primary ply zones.

Top and bottom input curves for the drop slope boundaries are defined on the OML skin as geodesic offsets. The input curves are associatively projected onto the appropriate OML offsets to locate the input curves in the correct ply zone offset locations. Oversized primary drop slopes are defined from the offset input curves. The internal shape of the drop slopes is controlled by the number of sections that span between the two input curves. These sections can be equally-spaced with respect to the input curves or defined using a chord-height error which specifies the maximum deviation between approximating polylines and the input curves. This chord-height approximation may be adaptive, i.e. the number of sections used may increase with the curvature of the input curves to improve the shape quality.

Secondary ply zone surfaces are then constructed as normal offsets from the primary ply zone surfaces, and secondary drop slope surfaces constructed from the primary drop slope surfaces. The offset parameter takes into account, for example, any part-to-part gaps or adhesive allowances. This method of constructing secondary ply zones and drop slopes from primary ply zones and drop slopes ensures that any offset distances between the primary and secondary drop slopes are the same as any offset distances between the primary and secondary ply zones. It also ensures the secondary drop slopes are formed in the correct lateral position.

The secondary drop slopes are associatively split, to the exact size required, along the intersects with ply zones and other drop slopes. The ply zones are then associatively split to the exact size required where the oversized ply zones intersect with drop slopes. These sized ply zones and drop slopes form a continuous surface. The procedural skin is thereby defined in terms of parameters, for example ply zone thicknesses and drop slope rates.

Once the procedural skin has been derived, datum skins defining working surfaces are generated from the procedural skin by substituting relevant values, stored in a database, for each parameter used in the definition of the procedural skin. A working surface (i.e. IML) may be the surface of an airframe structure component and may be the abutment surface of two components, as in FIG. 3, where the Nominal Skin IML 20 is the abutment surface of the composite skin panel 10 and the sacrificial plies 14. Alternatively, the working surface may be a hypothetical surface related to, and either internal or external to, an airframe structure component; for example, the Neutral Axis IML 18 is used for stress analysis of the composite skin panel 10. The datum IML skins are then stored for use in the manufacture of the airframe structure.

Using a parameterised, theoretical procedural skin facilitates management of offset thicknesses, etc. and allows top level design changes, for example modifications to OML features or ply zone thicknesses, to be incorporated easily and quickly into all of the IML models. The provision of procedural construction histories provides design traceability.

To optimize the airframe structure design for ease of manufacture, the Nominal Structure IML 26 is approximated with a certain number of singly-curved surface facets within a specified maximum allowable chord-height error (d). This allows the outer flange surface machining to be carried out in a low number of passes, for example by flank machining (using the side of a cutter), rather than by expensive, time-consuming scan machining processes, such as ball milling (with the end of a cutter). If the surface cannot be approximated by the specified number of facets within the maximum allowable chord-height error, a warning is given; one or both of the chord-height allowance and the number of facets is then adjusted to enable the surface to be approximated. Doubly-curved surfaces may be approximated with singly-curved facets. A procedural model of a faceted surface may be created to enable procedural definition of faceted surfaces for the Nominal Structure IML 26. The automatic generation of faceted surfaces from the procedural faceted surface allows rapid updating of the datum faceted surfaces following line changes or parameter modification, etc.

Similarly, the Nominal Structure IML 26 may be offset and approximated with a certain number of planar surface facets. A constant web angle ($\theta$) between the web plane 32 of the substructure and each facet is maintained for efficient manufacturing. For a twisting substructure, i.e. a structure with a Nominal Structure IML 26 having a curvature perpendicular to the spar or rib, the flange thickness must vary if a constant angle is to be maintained. A minimum flange thickness (t) is therefore specified to ensure the structure of the spar or rib is not compromised. Alternatively, the flange thickness may be maintained. In this case, the angle between the web plane 32 and each facet is varied.

Having now described various embodiments it will be understood by the skilled person that numerous modifications can be made. The process for the design of airframe structures is applicable to different constructions of component layers, for example composite skins and composite substructure, composite skins and metallic substructure, and any other combination of these materials. This invention is not limited to airframes but may be applied to any complex blended body structure, for example racing cars or ships.

As an alternative to constructing isolated datum copies of the IMLs within the same master model, multiple master models may be produced, each dedicated to one IML. These can then be saved as linked copies rather than isolated copies; as the master model is changed to take into account modifications to the design, the linked copies of the IMLs and any associated solid models are automatically updated wherever they are in use.

It will also be appreciated that the methods of generating drop slope surfaces and faceted surfaces described herein may be applied independently of each other and of the other features of the invention.

The invention claimed is:

1. A computer-implemented method of designing a virtual model of a aircraft blended body structure having two or more layered components for use in manufacture of the structure, wherein the method is implemented in a computer system comprising one or more processors configured to execute one or more computer program modules, the method comprising the steps of:
   defining a parameterised, theoretical procedural skin representing an external shape of the aircraft blended body structure;
   generating at least two datum skins from the procedural skin, each datum skin defining a working surface of a component in the aircraft blended body structure;
   defining at least one primary ply zone surface;
   defining at least one primary drop slope surface wherein the surface of the drop slope intersects the surface of a ply zone along a joint line; and
   defining a secondary ply zone surface as a normal offset to each primary ply zone surface and a secondary drop slope surface as a normal offset to each primary drop slope surface.

2. A method as claimed in claim 1 wherein at least one of the working surfaces is the surface of a component in the physical structure.

3. A method as claimed in claim 2 wherein two components abut along a working surface.

4. A method as claimed in claim 1, wherein at least one of the working surfaces is a hypothetical surface related to, and either internal or external to, a component in the physical structure.

5. A method as claimed in claim 1, wherein at least one surface in the procedural skin or a datum skin is non-planar, the method further comprising generating a linearly-tapered offset surface from said surface as a drop slope.

6. A method as claimed in claim 1, wherein at least one ply zone surface or drop slope surface is oversized, the method further comprising the step of trimming each oversized surface to the joint line.

7. A method as claimed in claim 1, wherein at least one ply zone surface or drop slope surface is undersized, the method further comprising the step of extending the or each undersized surface to the joint line.

8. A method as claimed in claim 1, wherein at least one ply zone surface or drop slope surface is non-planar.

9. A method as claimed in claim 8 further comprising the step of generating a faceted surface in approximation of at least one said non-planar surface in the procedural skin or a datum skin, to optimize the structure design for ease of manufacture.

10. A method as claimed in claim 9 wherein the faceted surface approximation is generated within a specified tolerance.

11. A microprocessor programmed to carry out a method of designing a virtual model of a aircraft blended body structure having two or more layered components for use in manufacture of the structure, the method comprising the steps of:

defining a parameterised, theoretical procedural skin representing an external shape of the aircraft blended body structure;

generating at least two datum skins from the procedural skin, each datum skin defining a working surface of a component in the aircraft blended body structure;

defining at least one primary ply zone surface;

defining at least one primary drop slope surface wherein the surface of the drop slope intersects the surface of a ply zone along a joint line; and defining a secondary ply zone surface as a normal offset to each primary ply zone surface and a secondary drop slope surface as a normal offset to each primary drop slope surface.

12. A processor readable medium comprising program code executable by a processor to carry out a method of designing a virtual model of a aircraft blended body structure having two or more layered components for use in manufacture of the structure, the method comprising the steps of:

defining a parameterised, theoretical procedural skin representing an external shape of the aircraft blended body structure;

generating at least two datum skins from the procedural skin, each datum skin defining a working surface of a component in the aircraft blended body structure;

defining at least one primary ply zone surface;

defining at least one primary drop slope surface wherein the surface of the drop slope intersects the surface of a ply zone along a joint line; and defining a secondary ply zone surface as a normal offset to each primary ply zone surface and a secondary drop slope surface as a normal offset to each primary drop slope surface.

13. The method of claim 1, wherein the procedural skin is defined in terms of one or more parameters.

14. The method of claim 13, wherein the datum skins are generated from the procedural skins by substituting values for each parameter used in the definition of the procedural skin.

* * * * *